Patented Nov. 21, 1939

2,180,637

UNITED STATES PATENT OFFICE 2,180,637

AMINO ACIDS PRODUCT AND METHOD OF MANUFACTURE

Kenneth S. Kemmerer, Evansville, Ind., assignor to Mead Johnson & Company, Evansville, Ind., a corporation of Indiana No Drawing. Application August 19, 1938, Serial No. 225,717

5 Claims. (Cl. 260—529)

This application is a continuation-in-part of my application, Serial No. 152,236, filed July 6, 1937, which relates to a nutrient product which contains all of the amino acids resulting from the hydrolysis of highly purified proteid material.

The main object of the invention is to produce a product of the character described, which is suitable for oral, rectal, and intravenous administration, for furnishing the body with the elements required for body protein. The product is adapted for intravenous or other administration in cases where the blood serum protein has decreased below normal, in which it is frequently impossible to absorb or digest protein by mouth.

Proteins contain varying percentages of amino acids and some are nutritionally inadequate. Gelatine, for example, lacks tyrosine and tryptophane. The lactalbumin and casein of milk, the glycinin of the soy bean, and the protein of beef muscle are nutritionally adequate. I prefer to use casein as the protein material to be treated. When prepared by the enzymatic hydrolysis process herein described, the resultant product is characterized by the preservation therein of all of the amino acids naturally occurring in the chosen proteid material, and when prepared by acid hydrolysis, the resultant product contains all of the amino acids, except tryptophane, naturally occurring in the chosen proteid material. Tryptophane in an amount (2.2 per cent) equal to that of the original protein is added to the product resulting from the acid hydrolysis procedure. Thus, by either method, I attain a product which is a pure mixture of amino acids that is adequate in every sense for biological utilization, and contains all of the amino acids naturally occurring in the chosen proteid material.

The formation of amino acids from proteins by hydrolysis with acids, alkalis or enzymes is well known, the objects of prior art methods being the production of sodium compounds of amino acids for food flavoring purposes, or the separation of one amino acid from others. The hydrolytic splitting of proteins into their constituent acids usually results in a black, disagreeable solution, which, on drying, gives an unpalatable, odorous and offensive preparation, not suitable for human use. My product is a purified mixture of amino acids, obtained from the hydrolysis of highly purified proteid material. The product of my invention, intended for entirely different and new uses, is highly purified and has a minimum of taste and flavor; it contains all of the amino acids, as distinguished from the salts of amino acids, resulting from the hydrolysis of highly purified proteid material; is practically devoid of ash constituents and free from sodium chloride; and is free of the hydrolytic and neutralizing agents employed in its preparation.

The resultant product is a dry, nearly white, fine and fluffy powder composed of all the amino acids resulting from hydrolysis of pure protein material, the product having a very low ash content, not less than 12 per cent total nitrogen and not less than 9.2 per cent amino nitrogen.

In the acid hydrolysis procedure, casein or other nutritionally adequate protein material may be precipitated by any mineral or organic acid. The acid precipitated casein is purified by washing repeatedly with acidified water to effect removal of the mineral salts. Hydrochloric acid or acetic acid may be used.

The purified casein is refluxed for approximately sixteen hours with 33%, by volume, sulphuric acid. Any mineral acid, as hydrochloric, sulphuric or phosphoric acid, etc., may be used but sulphuric acid is preferred due to its ease of removal. The time may be varied if the pressure is also varied. Thus a shorter time of hydrolysis is feasible if the pressure is increased. Likewise the concentration of the acid may vary if the time of refluxing is shortened or lengthened correspondingly. There is no definite set of conditions for the hydrolytic process. However, the 33% sulphuric acid concentration gives the best results in that there is a minimum of decomposition products formed.

The hydrolyzed material is then heated to a minimum of 180° F. A maximum of 220° F. may be used.

The heated material is then diluted with approximately three volumes of water heated to 180° F. or more, and the chemically equivalent amount of barium hydroxide necessary to neutralize the hydrolytic agent. The quantity of water may be varied.

Preferably at the time the barium hydroxide is added, I add activated carbon for decolorizing the material. "Norit", the trade name of an activated carbon, is preferred, in the proportion of one-fifth by weight of the original protein.

The precipitated barium sulphate and carbon are then filtered off.

The resultant straw colored solution is next concentrated under vacuum to incipient crystallization. Concentration under vacuum is essential as decomposition results if the temperature becomes too high.

Additional barium hydroxide is added carefully until complete removal of the hydrolytic agent (sulphuric acid) is indicated by tests. The object is not to neutralize the preparation to a definite pH, but to effect exact removal of the hydrolytic agent and freedom from alkali metal salts.

Next an excess of hydrogen sulphide is added to precipitate the heavy metals such as copper, lead, tin, zinc, iron, nickel, arsenic, mercury, etc.

Finally the preparation is filtered, concentrated and dried, either by drum or spray drying.

The use of sulphuric acid as the hydrolyzing agent and of barium hydroxide as the neutralizing agent is advantageous because of the formation of the insoluble salt, which can be entirely removed. Thus, there remains no mineral acid or neutralizing agent (barium hydroxide), both being exactly removed by filtration as the insoluble salt, barium sulphate. The final product has not less than 12 per cent total nitrogen and not less than 9.2 per cent amino nitrogen.

The product thus prepared is characterized by the preservation therein of all the amino acids, except tryptophane, naturally occurring in the chosen protein material. Tryptophane, 2.2 per cent, is added to restore the essential amino acid.

When the protein is enzymatically hydrolyzed, the tryptophane is not destroyed and is present in the finished product as such. The procedure is as follows:

A mixture is prepared of water, protein, alkali and enzyme in the proportion of one pound of protein to 5 quarts of water, 20 grams of sodium carbonate (or its chemical equivalent in other alkali) and 3 pounds of pancreas or its equivalent if the enzyme source is more or less potent. Casein is preferred as the protein source as it is readily acted upon by the pancreatic enzymes. Likewise sodium carbonate is chosen because it does not inhibit the enzymatic action and has no serious deleterious effects on the final product or its utilization by the animal organism. The mixture is preserved with a suitable bactericidal agent. A mixture of 2 gallons of toluene and 1 gallon of chloroform for every 200 gallons of mix is preferred as it is effective in preventing putrefaction and is easily removed at the end of the digestion period.

The temperature of the mixture is maintained at 100° F. throughout the digestion period. A somewhat higher or lower temperature may be used but 100° F. is most satisfactory. The amount of alkali added preferably is of sufficient quantity to maintain a pH value of 7.4 at the start, to 6.2 at the completion of the digestion. The amount of alkali added may be varied within certain limits, the object being to have enough present to maintain an hydrogen ion concentration compatible with a rapid hydrolysis which is brought about by the enzyme source used. I have preferred to use finely chopped, fresh, pork pancreas as a source of enzyme as it is an economical and potent source of the desired hydrolytic agents, trypsin and erepsin. These enzymes, acting together, bring about a fairly complete and rapid hydrolysis of the protein concerned. However, the digested material is not completely composed of amino acids but is of a mixture of amino acids and compounds known as polypeptides. The latter class of compounds represents a small proportion of only partially digested protein. However, even this small amount of material is digested to such an extent that no protein test reacts positive and likewise, all anaphylactogenic properties of the original protein are lost.

After from 3 to 5 days of the digestion period have elapsed, another portion of enzyme source equal in amount to the original used is added. The digestion is then allowed to proceed from 3 to 5 days more, or until there is no increase, from day to day, in amino nitrogen content and protein tests are negative. At the completion of the digestion an amount of acid chemically equivalent to the alkali used is added. Hydrochloric acid is preferred since it forms sodium chloride from the sodium carbonate used originally. Thus the amino acids are present in the free state and not as sodium salts.

An amount of decolorizing carbon equal to 5 per cent by weight of the protein used is added and the liquid heated to boiling for a short time. This heat treatment serves three purposes: it evaporates the toluene and chloroform from the liquid, aids in decolorization, and sterilizes the liquid.

The boiled, sterilized liquid is filtered, evaporated in vacuo to a suitable concentration and either spray or vacuum drum dried.

The product prepared by the method just described differs from the acid hydrolyzed material in that tryptophane has not been destroyed and therefore does not have to be added; further, it contains approximately 3 per cent of sodium chloride. The products prepared by either of the methods described are characterized by freedom from objectionable contaminants, white color, and fine, fluffy appearance, practical freedom from ash constituents, minimum taste and flavor, their highly nutrient quality, being adequate in nitrogen containing compounds to support growth, reproduction and lactation. They are suitable for oral, rectal, and intravenous administration.

I claim:

1. The process of preparing from highly purified proteid material, a nutrient product suitable for oral, rectal and intravenous administration and characterized by the preservation therein of all the amino acids naturally occurring in the chosen proteid material, which comprises preparing a mixture of water, highly purified protein, alkali, proteolytic enzymes and easily removable germicidal and bacteriostatic agents, the alkali being sufficient to maintain a pH value of 6 to 9, subjecting the mixture to a digestion period at approximately 100° F. until practically complete hydrolysis of the protein has taken place, adding another portion of the enzymes, continuing the digestion until there is no increase, from day to day, in the amino nitrogen content and protein tests are negative, adding an amount of acid chemically equivalent to the alkali used. Adding decolorizing carbon, boiling for a short time, filtering and drying the filtrate.

2. The process of preparing from highly purified proteid material, a nutrient product suitable for oral, rectal and intravenous administration and characterized by the preservation therein of all the amino acids naturally occurring in the chosen proteid material, which comprises preparing a mixture of water, highly purified protein, sodium carbonate, pancreas and easily removable germicidal and bacteriostatic agents, the sodium carbonate being sufficient to maintain a pH value of 6 to 9, subjecting the mixture to a digestion period at approximately 100° F. until practically complete hydrolysis of the protein has taken place, adding another portion of the pancreas, continuing the digestion until there is no increase, from day to day, in the amino nitrogen content and protein tests are negative, adding an amount of acid chemically equivalent to the sodium carbonate used, adding decolorizing carbon, boiling for a short time, filtering and drying the filtrate.

3. The process of preparing from highly purified proteid material, a nutrient product suitable for oral, rectal and intravenous administration and characterized by the preservation therein of all the amino acids naturally occurring in the chosen proteid material, which comprises preparing a mixture in the proportion of approximately five quarts of water, one pound of highly purified protein, twenty grams of sodium carbonate, and three pounds of pancreas, adding a bactericidal agent consisting of two gallons of toluene and one gallon of chloroform for every two hundred gallons of the mix, the sodium carbonate being sufficient to maintain a pH value of 6 to 9, subjecting the mixture to a digestion period at approximately 100° F. until practically complete hydrolysis of the protein has taken place, adding another portion of the pancreas, continuing the digestion until there is no increase, from day to day, in the amino nitrogen content and protein tests are negative, adding an amount of acid chemically equivalent to the sodium carbonate used, adding decolorizing carbon, boiling for a short time, filtering and drying the filtrate.

4. The process of preparing from highly purified proteid material, a nutrient product suitable for oral, rectal and intravenous administration and characterized by the preservation therein of all the amino acids naturally occurring in the chosen proteid material, which comprises preparing a mixture of water, highly purified protein, alkali, proteolytic enzymes and easily removable germicidal and bacteriostatic agents, the alkali being sufficient to maintain a pH value of 6 to 9, subjecting the mixture to a digestion period at approximately 100° F. for three to five days, until fairly complete hydrolysis of the protein has taken place and all anaphylactogenic properties of the original protein are lost, adding another portion of the enzymes equal in amount to the original amount used, continuing the digestion for another three to five days, or until there is no increase, from day to day in the amino nitrogen content and protein tests are negative, adding an amount of acid chemically equivalent to the alkali used, adding decolorizing carbon, boiling for a short time, filtering and drying the filtrate.

5. A nutrient material suitable for oral, rectal, and intravenous administration, containing all of the amino acids resulting from the hydrolysis of highly purified proteid material, and characterized by the preservation in the hydrolyzed material of all the amino acids naturally occurring in the chosen proteid material, and by practical freedom from ash constituents.

6. A nutrient material suitable for oral, rectal, and intravenous administration, containing all of the amino acids resulting from the hydrolysis of highly purified proteid material, and characterized by the preservation in the hydrolyzed material of all the amino acids naturally occurring in the chosen proteid material, and by practical freedom from ash constituents, said product being further characterized by a minimum of taste and flavor and having not less than 12 per cent total nitrogen.

KENNETH S. KEMMERER.